Patented Feb. 19, 1935

1,991,948

UNITED STATES PATENT OFFICE 1,991,948

PROCESS OF REACTING OLEFINES WITH SULPHURIC ACID

Kenneth B. Lacy, Highland Park, Ill., assignor to Van Schaack Bros. Chemical Works, Inc., Chicago, Ill., a corporation of Illinois No Drawing. Application January 17, 1931, Serial No. 509,547

20 Claims. (Cl. 260—99.12)

This invention relates to a process of reacting olefines with sulphuric acid. One purpose of the invention is to decrease the amount of olefine polymerized. Other objects will appear from the detailed description that follows.

When an olefine, such as a butene, is brought into contact with sulphuric acid, at least two reactions may occur. The olefine may combine with the acid to give mono- or dialkyl sulphate. Or, the olefine may be converted into a hydrocarbon of higher boiling point than the olefine used, that is, into a polymer.

To decrease this tendency to form polymers during the absorption of olefines in sulphuric acid there has been used relatively dilute sulphuric acid at relatively low temperatures.

I have now discovered a process that makes possible the use of more severe conditions of absorption, that is, either a higher concentration of acid, a higher temperature, or both, without producing excessive amounts of polymers.

In general, I find that the presence of large proportions of polymers in contact with the sulphuric acid during the absorption of gaseous olefines increases the amount of polymers formed from the gas being absorbed. For this reason, I remove polymers as formed, so that the incoming gas is absorbed in an acid liquor that is in contact with a minimum quantity of polymers.

The process, comprising the step of removing polymers as soon as feasible after their formation, is illustrated by the following example: Diluted sulphuric acid is allowed to trickle downward through a tower containing means for distributing the acid over a large surface, as, for example, an upright pipe filled with ceramic rings and equipped with perforated plates for assisting in the distribution of the liquid. A gas rich in olefine content as, for example, the fraction of vapor-phase cracked petroleum comprising a high percentage of propylene, butylenes, and/or amylenes, is passed upward through the tower, counter-currently to the descending acid. During this passage there is reaction of a part of the olefines to give polymers and compounds with sulphuric acid; the unabsorbed part of the gas is allowed to pass out of the top of the tower. The acid liquor, comprising compounds of olefines with sulphuric acid and also admixed polymers, flows more or less continuously from the bottom of the tower into a vessel for settling. Here there forms an upper polymer layer and a lower acid liquor layer. The upper layer is withdrawn from the process whereas the lower is returned to the top of the tower for flowing down the tower again. The recirculation of the acid liquor, after the gravity separation of the polymer layer, is repeated as many times as desired, suitably until the acid liquor becomes relatively a poor absorbent for olefines of the reactivity of propylene or 1-butene, as, for example, until the alcohol content of the liquor, as determined by dilution with twice its weight of water and then fractionating, is 20 to 50%, say about 40%, of the weight of the acid liquor.

Since the time of flow of the acid liquor over the filling material in a packed column without arrestors for holding up an appreciable volume of liquor is small, the actual time during which a given portion of the polymers remains in the tower, in contact with olefine gases, is short.

The reaction occuring in the tower evolves heat. Also, it is desirable to maintain approximately a selected temperature of acid liquor within the tower, as, for example, a temperature between 35° and 65° C., say between 45 and 55° C. This may be done by the use of cooling coils carrying cold water, the coils being placed either inside or outside the tower. Conveniently, these coils may be outside the tower and the acid liquor brought into contact therewith by means of a pump, either before or after the separation of the polymer layer from the liquor; in this case, cooled acid liquor is returned to the top of the absorption tower, suitably at a temperature of approximately 5° to 15° C. below the average reaction temperature that it is desired to maintain during the absorption.

It will be evident that the reacting materials in the absorption tower will comprise a liquid and a gas phase and that the liquid phase will be discontinuous. By this term it is meant that the particles, drops, droplets or films of liquid are separated from each other, with portions of the gas phase intervening. The particles of the liquid phase thus are not in contact with each other throughout the length of the tower.

This discontinuous phase of acid liquor may be produced in an alternative manner to that described. Thus, the liquor may be allowed to fall, as a shower or spray, through an uprising stream of olefine-containing gas, as in an upright pipe.

It will be evident also that the amount of acid liquor in proportion to the gas present in the reaction vessel at any one time is much less than would be used if the whole batch of a several hours' supply of acid were placed at one time into a vessel and gas bubbled through to saturation, without withdrawing or adding any liquor during the absorption.

The diluted acid specified in the above illustrative example may contain in excess of 10 parts water for each 90 parts of sulphuric acid, calculated on the anhydrous basis. The proportion of water may well be 13 to 50 per cent of the total water-sulphuric acid mixture. Thus, I have used satisfactorily percentages of sulphuric acid ranging from 60 to 87%, for instance, 87%, 85%, 80%, 75%, 60%.

The olefine-containing gas may be used at any one of several pressures, for example, atmospheric or higher. I have used to advantage gas pressure ranging from atmospheric to just slightly below that at which condensation of gas to liquid occurs at the temperature used. For example, a gas containing no substantial amounts of any ingredient of higher boiling point than butylene may be used at pressures up to 75 lbs., or higher, say 50 lbs., gage pressure.

Catalysts may be present in the absorption tower. Examples are sulphates of metals, such as copper or iron, or carbon.

The time allowed for the gravity separation of the polymer layer from the acid liquor before returning the latter to the absorption system may be varied over wide limits, as from a small fraction of a minute to an hour or more. Obviously, the separation is more nearly complete the longer the time allowed for the rising of the layer of oil. As the time of settling, I have used satisfactorily a few minutes or less, when the polymers being separated are mostly of low viscosity, and a much longer time, say several hours, when large quantities of the polymers are comprised in a viscous emulsion. By gravity separation or separation by gravity, as used in the specifications or claims, I include any means of separation based upon difference of specific gravity of the polymers and acid liquor. This separation may be accelerated by centrifuging, as in a centrifuge of the cream separator type, or by diluting or extracting with naphtha or other hydrocarbon liquid.

When the separated acid liquor has come to contain as much alkyl sulphate as desired, then the acid liquor for recirculation through the absorption system may be replaced by fresh sulphuric acid or a mixture of fresh and used acid. Or fresh acid may be admixed continuously to the acid liquor as returned to the absorption system.

It will be apparent that the term "acid liquor" as used in this specification and the appended claims refers to a solution comprising essentially sulphuric acid and alkyl sulphate, which may also contain greater or less amounts of additional or incidental constituents such as suspended unseparated polymers, mineral salts, dissolved gases and the like.

The acid liquor produced in my process is suitable for use as a source of alkyl compounds. Thus the liquor may be diluted with 2 to 10 times its volume of water and then distilled, to produce monohydric alcohols.

My acid liquor is an acid solution comprising a substantial amount of alkyl sulphates.

I claim:

1. The process of reacting an olefine having more than two carbon atoms with sulphuric acid of concentration below 90 per cent whereby part of the olefine forms polymers, separating from the acid liquor a substantial proportion of the resulting polymers, and then bringing said separated acid liquor which comprises alkyl sulphate into contact with an additional quantity of olefine.

2. The process of reacting an olefine having more than two carbon atoms with sulphuric acid of concentration between 60 and 87 per cent whereby part of the olefine forms polymers, separating from the acid liquor a substantial proportion of the resulting polymers, and then bringing the separated acid liquor which comprises alkyl sulphate into contact with an additional quantity of olefine.

3. The process of reacting an olefine having more than two carbon atoms with sulphuric acid of concentration approximately 75 per cent whereby part of the olefine forms polymers, separating from the acid liquor a substantial proportion of the resulting polymers, and then bringing said separated acid liquor which comprises alkyl sulphate into contact with an additional quantity of olefine.

4. The process of reacting an olefine having more than two carbon atoms with sulphuric acid of concentration between 60 and 87 per cent whereby part of the olefine forms polymers, separating from the acid liquor a substantial proportion of the resulting polymers, and then bringing the separated acid liquor into contact with an additional quantity of olefine, at a temperature above 35° C.

5. The process of reacting an olefine having more than two carbon atoms with sulphuric acid of concentration between 60 and 87 per cent whereby part of the olefine forms polymers, separating from the acid liquor a substantial proportion of the resulting polymers, and then bringing the separated acid liquor into contact with an additional quantity of olefine, at a temperature above 35° C. and below 65° C.

6. The process of reacting an olefine having more than two carbon atoms with sulphuric acid of concentration between 60 and 87 per cent whereby part of the olefine forms polymers, separating from the acid liquor a substantial proportion of the resulting polymers, and then bringing the separated acid liquor into contact with an additional quantity of olefine, at a temperature of approximately 45 to 55° C.

7. The process of reacting an olefine having having more than two carbon atoms with sulphuric acid of concentration approximately 75 per cent whereby part of the olefine forms polymers, separating from the acid liquor a substantial proportion of the resulting polymers, and then bringing the separated acid liquor into contact with an additional quantity of olefine, at a temperature of approximately 45 to 55° C.

8. The process of reacting an olefine having more than two carbon atoms with sulphuric acid of concentration between 60 and 87 per cent whereby part of the olefine forms polymers, separating from the acid liquor a substantial proportion of the resulting polymers, and then bringing said separated acid liquor which comprises alkyl sulphate into contact with an additional quantity of olefine, said contact being made at a pressure below that at which the gas condenses to a liquid at the temperature of the acid liquor.

9. The process of reacting an olefine having more than two carbon atoms with sulphuric acid of concentration approximately 75 per cent whereby part of the olefine forms polymers, separating from the acid liquor a substantial proportion of the resulting polymers, and then bringing said separated acid liquor which comprises alkyl sulphate into contact with an additional quantity of olefine, said contact being made at a pressure below that at which the gas condenses to a liquid at the temperature of the acid liquor.

10. The process of reacting an olefine having more than two carbon atoms with sulphuric acid of concentration between 60 and 87 per cent whereby part of the olefine forms polymers, separating from the acid liquor a substantial proportion of the resulting polymers, and then bringing the separated acid liquor into contact with an additional quantity of olefine, at a temperature above 35° C. and below 65° C., said contact being made at a pressure below that at which the gas condenses to a liquid at the temperature of the acid liquor.

11. The process of reacting an olefine having more than two carbon atoms with sulphuric acid of concentration approximately 75 per cent whereby part of the olefine forms polymers, separating from the acid liquor a substantial proportion of the resulting polymers, and then bringing the separated acid liquor into contact with an additional quantity of olefine, at a temperature of approximately 45 to 55° C., said contact being made at a pressure below that at which the gas condenses to a liquid at the temperature of the acid liquor.

12. The process of reacting an olefine having more than two carbon atoms with sulphuric acid of concentration approximately 75 per cent whereby part of the olefine forms polymers, separating from the acid liquor a substantial proportion of the resulting polymers, and then bringing the separated acid liquor into contact with an additional quantity of olefine, at a temperature of approximately 45 to 55° C., said contact being made at a pressure substantially above atmospheric and below that at which the gas condenses to a liquid at the temperature of the acid liquor.

13. The process of reacting an olefine having more than two carbon atoms with diluted sulphuric acid in discontinuous liquid phase whereby part of the olefine forms polymers, separating the resulting polymers by gravity and returning the acid liquor which comprises alkyl sulphate to the absorption system.

14. The process of reacting an olefine having more than two carbon atoms with diluted sulphuric acid in discontinuous liquid phase whereby part of the olefine forms polymers, separating the resulting polymers by gravity, cooling, and returning the cooled acid liquor which comprises alkyl sulphate to the absorption system.

15. The process of reacting an olefine having more than two carbon atoms with diluted sulphuric acid in discontinuous liquid phase whereby part of the olefine forms polymers, separating the resulting polymers by gravity, cooling, returning the cooled acid liquor to the absorption system, and continuing the cycle until the acid liquor comes to contain alkyl sulphates equivalent to more than 20 per cent of alcohol on the weight of acid liquor.

16. The process of reacting an olefine having more than two carbon atoms with diluted sulphuric acid in discontinuous liquid phase, whereby part of the olefine forms polymers, separating the resulting polymers by gravity, cooling, returning the cooled acid liquor to the absorption system, and continuing the cycle until the acid liquor comes to contain alkyl sulphates equivalent to approximately 40 per cent of alcohol on the weight of acid liquor.

17. The process of reacting an olefine having more than two carbon atoms with 60 to 87 per cent sulphuric acid in discontinuous liquid phase whereby part of the olefine forms polymers, separating the resulting polymers by gravity, and returning the acid liquor which comprises alkyl sulphate to the absorption system.

18. The process of reacting gases produced in the vapor-phase cracking of petroleum with 60 to 87 per cent sulphuric acid in discontinuous liquid phase whereby part of the olefine forms polymers, separating the resulting polymers by gravity, and returning the acid liquor which comprises alkyl sulphate to the absorption system.

19. The process of producing alkyl sulphate which comprises the reaction of a gas rich in butylenes with sulphuric acid of approximately 75 per cent concentration whereby part of the olefine forms polymers, separating the resulting polymers as formed, and continuing the absorption, at a temperature between 35 and 65° C., until the acid liquor that is obtained contains alkyl sulphate equivalent to more than 20 per cent of alcohol on the weight of acid liquor.

20. The process of producing alkyl sulphate which comprises reacting an olefine having more than two carbon atoms with diluted sulphuric acid, whereby part of the olefine forms polymers, separating the polymers from the acid liquor, and then bringing the separated acid liquor, which comprises alkyl sulphate, into contact with an additional quantity of olefine.

KENNETH B. LACY.